(12) United States Patent
Mangini et al.

(10) Patent No.: US 8,402,047 B1
(45) Date of Patent: Mar. 19, 2013

(54) METHOD AND APPARATUS FOR GENERATING A QUERY TO SEARCH FOR MATCHING FORMS

(75) Inventors: Andrea L. Mangini, Santa Cruz, CA (US); Peter Merrill, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2150 days.

(21) Appl. No.: 11/067,564

(22) Filed: Feb. 25, 2005

(51) Int. Cl.
*G06F 7/00* (2006.01)

(52) U.S. Cl. .......................................... 707/769; 707/779

(58) Field of Classification Search .......................... None
See application file for complete search history.

(56) References Cited

U.S. PATENT DOCUMENTS

| | | | |
|---|---|---|---|
| 5,237,502 A * | 8/1993 | White et al. ...................... 704/1 |
| 5,251,316 A * | 10/1993 | Anick et al. ........................... 1/1 |
| 5,757,983 A | 5/1998 | Kawaguchi et al. |
| 5,886,693 A * | 3/1999 | Ho et al. ......................... 715/700 |
| 5,923,848 A * | 7/1999 | Goodhand et al. ............ 709/219 |
| 5,940,843 A * | 8/1999 | Zucknovich et al. .......... 715/210 |
| 6,107,944 A * | 8/2000 | Behr et al. ................. 340/995.12 |
| 6,141,656 A | 10/2000 | Barker et al. |
| 6,212,553 B1 * | 4/2001 | Lee et al. ....................... 709/206 |
| 6,360,215 B1 | 3/2002 | Judd et al. |
| 6,513,035 B1 | 1/2003 | Tanaka et al. |
| 6,591,289 B1 | 7/2003 | Britton |
| 6,665,666 B1 | 12/2003 | Brown et al. |
| 6,687,689 B1 | 2/2004 | Fung et al. |
| 6,694,328 B1 | 2/2004 | Bennett |
| 7,203,678 B1 * | 4/2007 | Petropoulos et al. .......... 707/775 |
| 2001/0003183 A1 | 6/2001 | Thompson et al. |
| 2002/0087551 A1 * | 7/2002 | Hickey et al. .................... 707/10 |
| 2002/0099735 A1 * | 7/2002 | Schroeder et al. ............. 707/513 |
| 2003/0144876 A1 * | 7/2003 | Kosinski et al. .................... 705/2 |
| 2003/0188262 A1 | 10/2003 | Maxwell et al. |
| 2004/0015778 A1 | 1/2004 | Britton et al. |
| 2004/0030781 A1 * | 2/2004 | Etesse et al. ................... 709/225 |
| 2004/0039990 A1 | 2/2004 | Bakar et al. |
| 2004/0243576 A1 | 12/2004 | Shrivastava et al. |
| 2005/0004935 A1 | 1/2005 | Thede |
| 2005/0010600 A1 | 1/2005 | Ciaramitaro et al. |
| 2005/0071752 A1 | 3/2005 | Marlatt |
| 2006/0089983 A1 * | 4/2006 | Piersol .......................... 709/223 |

OTHER PUBLICATIONS

FormManager: An office forms management system Yao, Hevner, Shi and Luo ACM Transactions on Information Systems vol. 2 issue 3 1984 ACM Press.
"On developing a simple in-house digital library archive," Eric L. Brown, Luis G. Velaszco, G. Kirksey, S. Ramaswamy, M. Rogers, Proceedings of the 43rd annual southeast regional conference, vol. 1, ACM-SE 43, ACM Press.

* cited by examiner

*Primary Examiner* — Christyann Pulliam
*Assistant Examiner* — Daniel Kuddus
(74) *Attorney, Agent, or Firm* — Wolfe-SBMC

(57) ABSTRACT

One embodiment of the present invention provides a system that generates queries to search for matching forms in a set of forms, without requiring a pre-configured forms management system. During operation, the system obtains a form template, wherein the form template includes a form schema which specifies field names and data types for fields in form instances associated with the form template. Next, the system allows a user to specify search criteria for one or more fields defined by the form schema. Then the system generates a query based on search criteria entered by the user, and runs the query against the set of forms to identify matching forms. Finally, the system generates a list of the matching forms.

20 Claims, 2 Drawing Sheets

METHOD AND APPARATUS FOR GENERATING A QUERY TO SEARCH FOR MATCHING FORMS

BACKGROUND

1. Field of the Invention

The present invention relates to systems that support computer-based forms. More specifically, the present invention relates to a method and an apparatus that facilitates generating a query on-the-fly to search for matching forms in a repository containing previously submitted forms.

2. Related Art

Tasks are often organized into "work flows," wherein a workflow comprises a series of steps required to accomplish a specific task, such as purchasing a car. Workflows often involve the circulation of forms via paper, email, or some other communication medium. In general, loosely coupled workflows (which are not managed by a forms management system) operate by: distributing forms; allowing people to fill out forms; and collecting completed forms. Once the completed forms have been collected, it is often necessary to search for specific form instances based on the data contained within the forms. Whether searching through printed or electronic forms, without a forms management system a substantial amount of effort is required to locate a specific form instance based on data contained within the form instance.

Furthermore, even if a forms management system is used, a great amount of effort and expense is typically required to set up and maintain the forms management system. Furthermore, in existing forms management systems, a system administrator typically has to configure the forms management system to search through specific fields of interest within the forms. Next, when the user wants to search for specific forms, the system imports data from relevant form instances, and searches for matching form instances based specific values in the fields of interest. (Note that a forms management system typically comprises software (often located on a server), which is designed to manage large numbers of forms and to facilitate various operations involving forms, such as storage, retrieval and searching.)

It is also possible to store data from fields of the completed forms in a database. In this way, matching forms can be identified by formulating appropriate database queries. However, a significant amount of effort and expense is involved in procuring, setting up and maintaining a database system. Hence, it is not always practical to store completed forms in a database system. Hence, what is needed is a method and an apparatus that facilitates searching for forms without the problems described above.

SUMMARY

One embodiment of the present invention provides a system that generates queries to search for matching forms in a set of forms, without requiring a pre-configured forms management system. During operation, the system obtains a form template, wherein the form template includes a form schema which specifies field names and data types for fields in form instances associated with the form template. Next, the system allows a user to specify search criteria for one or more fields defined by the form schema. Then the system generates a query based on search criteria entered by the user, and runs the query against the set of forms to identify matching forms. Finally, the system generates a list of the matching forms.

In a variation on this embodiment, allowing the user to specify search criteria involves importing the form template into a user interface (UI), wherein the UI uses the form schema to generate type-specific input options which enable the user to specify search criteria for fields defined in the form template.

In a variation on this embodiment, running the query involves running the query against forms in the set of forms which contain matching fields for the search criteria, but which may have a different structure than the structure defined by the form template.

In a variation on this embodiment, running the query against the set of forms involves automatically generating an index of data from the forms in the set of forms, so that subsequent searches involving the forms will run faster.

In a variation on this embodiment, running the query against a given form in the set of forms involves: opening the given form; and evaluating the query for specific data values from specific fields in the given form to determine if the given form matches the query.

In a variation on this embodiment, the set of forms comprises a directory in a file system which contains previously submitted forms.

In a variation on this embodiment, the form template additionally includes presentation information defining the appearance and placement of data fields in a visual rendering of an associated form instance.

DETAILED DESCRIPTION

Figure 1:
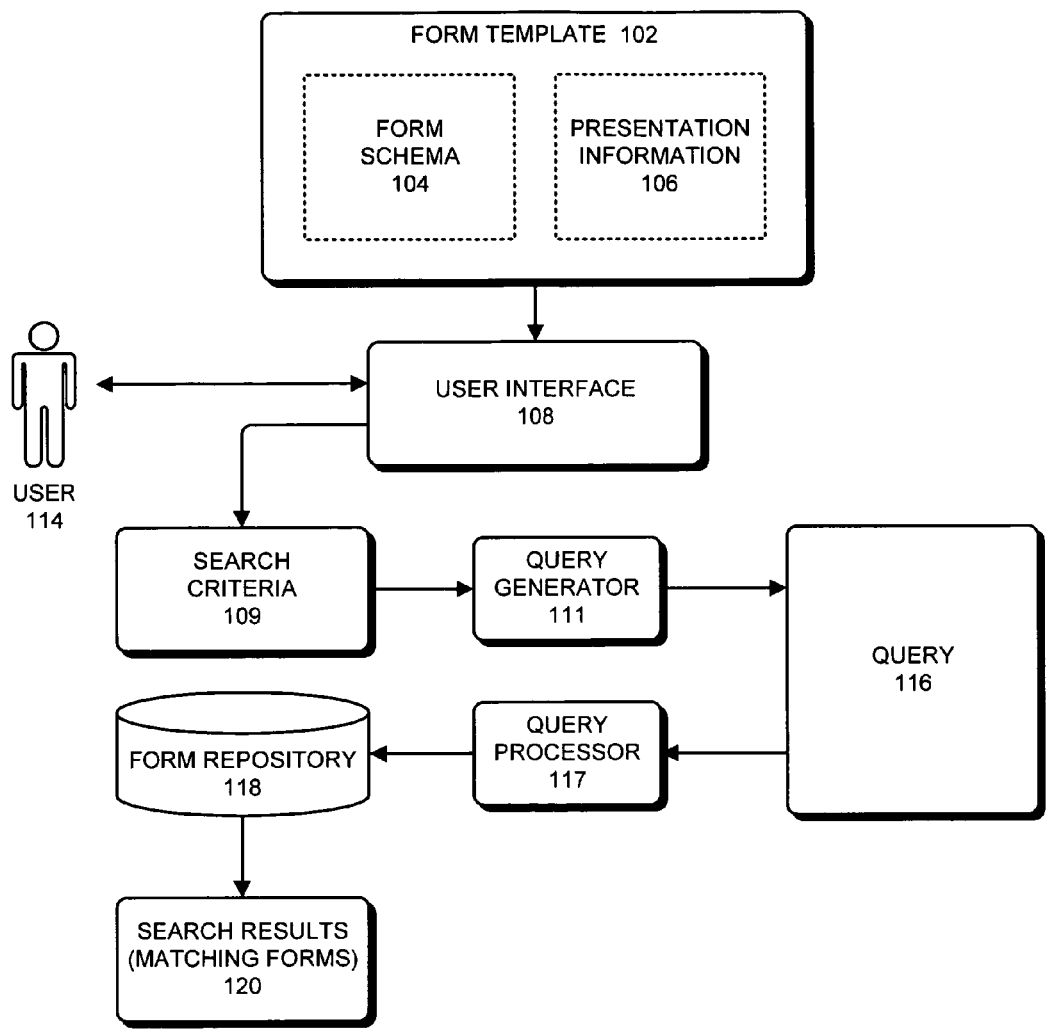
FIG. 1 illustrates a system that facilitates generating a query on-the-fly in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

System

One embodiment of the present invention provides a system which facilitates searching for forms using a familiar query interface, wherein the form instances have been collected on a simple storage device, such as in a directory on a file system. The idea is we use the field name and definition information present in a form template (or in one of the form data files) to infer an "on-the-fly" schema for search, which can be used to search across a collection of similar forms data files. The schema is inferred from an example template or data file, and is then applied to the searching of all instances of the form data files. All of this is accomplished without a forms management system, and requires no index building up front.

This system operates within a computer system (not shown), which can generally include any type of centralized or distributed computer system.

The system starts with a "form template" 102, which includes a "form schema" 104 and "presentation information" 106, which are used to generate an instance of a form. Form schema 104 includes metadata for and associated form, wherein the metadata can include field names and type information for a given form. Presentation information 106 specifies how the generated form is to be presented to the user. This can include any information that specifies how the form and associated fields are to be presented to the user. For example, presentation information 106 can specify the geometrical layout of the rendered form, as well as colors graphical features that appear on the rendered form. It can also specify the appearance and placement of data fields in the rendered form. Form template 102 can be combined with associated "form data values" (not shown) to produce an instance of the form.

Form template 102 is imported into user interface 108, which uses the form schema to generate type-specific input options which enable the user to specify search criteria for fields defined by the form template.

Query 116 can be run against a form repository 118 containing previously submitted forms. This produces search results 120, which identify forms that match the search criteria. Form repository 118 can generally include any data store that can be used to store forms. In one embodiment of the present invention, repository 118 is a portion of a file system (such as a directory), which contains the previously submitted forms. Note that form repository 118 can also include a distributed collection of forms, which are spread out across multiple locations in a computer system.

This entire process is described in detail below with reference to the flow chart in FIG. 2.

Generating and Running a Query

Figure 2:
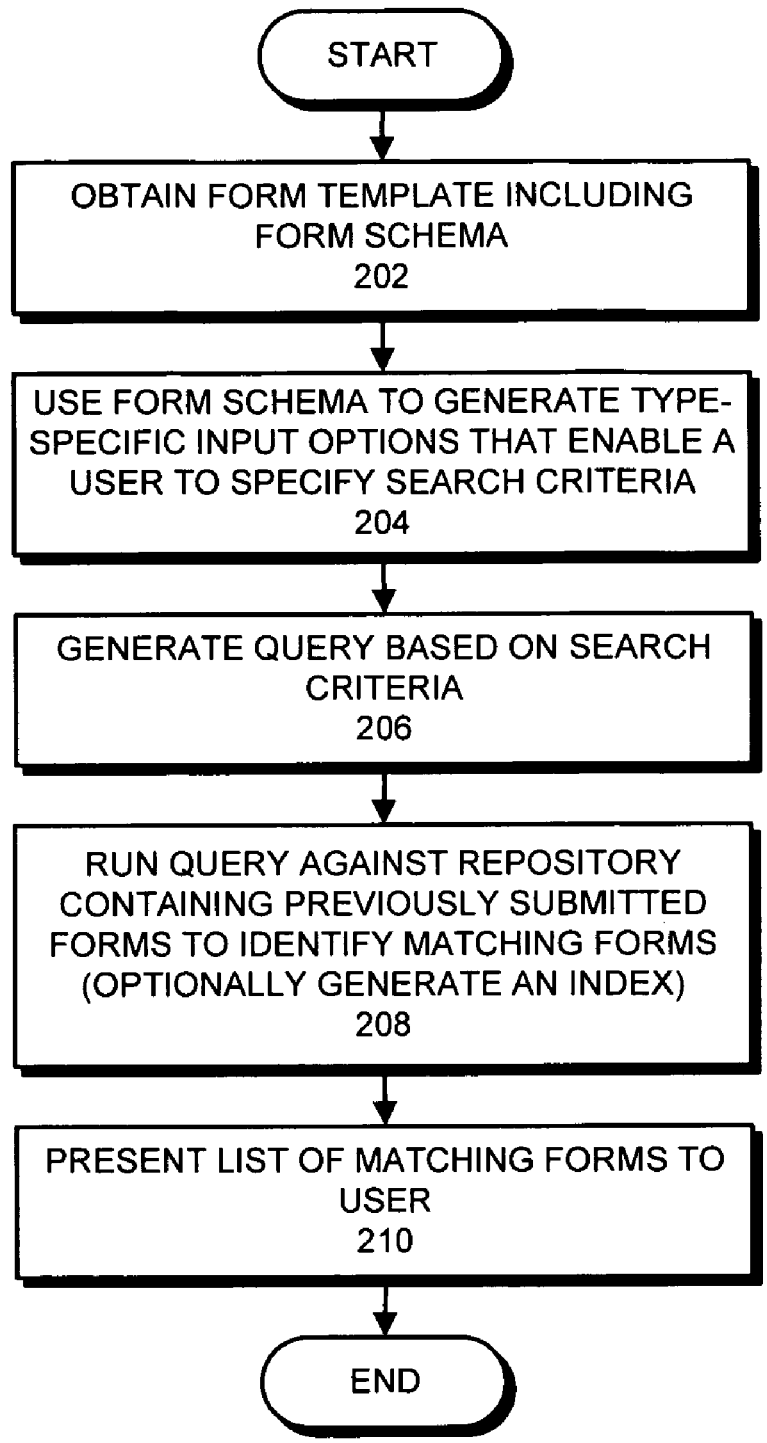
FIG. 2 presents a flow chart illustrating the process of generating and running a query in accordance with an embodiment of the present invention.

More specifically, FIG. 2 presents a flow chart illustrating the process of generating and using a rendered form as a search template in accordance with an embodiment of the present invention.

At the start of the process, a user indicates that they want to perform a forms search, for example by activating a search command in a user interface. The system then obtains a form template 102 (step 202). For example, form template 102 can be selected by a user from a database containing a large number of form templates. As mentioned above, form template 102 includes form schema 104 and presentation information 106 specifying how the associated form is to be presented. Based on the file type of the form template, the system can use type-specific methods to extract the data related to the form fields, such as field name and field type information. For example, in the case of a PDF form, embedded XFA in the form would be extracted, and the XML defining the field names and the type information would be extracted.

Next, the system uses the form schema 104 to generate type-specific input options within a user interface which enable the user to easily enter search criteria (step 204). For example, the user can be presented with a UI that allows for the building of query expressions. The user can then build query expressions using the extracted field names, various operators that are available (based on the extracted type information), and user-entered data values; (for example, field "foo" equals 7).

The system then generates a query based on the search criteria (step 206).

Next, the system runs the query against repository 118, which contains previously submitted forms, to identify forms matching the search criteria (step 208). During this process, the query processor opens each form and calculates the search expression to determine if there is a match. If there is a match, the matching form is placed in a list of matching forms. (Note that this list of forms can include identifiers for forms and/or links to the associated forms.)

While the query is examining forms, the system can optionally generate an index of data from the previously submitted forms in the repository, so that subsequent searches involving the previously submitted forms will run faster.

Finally, the system presents a list of the matching forms to the user (step 210).

EXAMPLE

For example, a user can create a form with fields and entry types as follows.
(Name)=(Text entry)
(Serial Number)=(10-digit numeric)
(Date)=(date value)

This form is subsequently distributed to 10,000 people, and 10,000 PDF files (form instances) are returned via email, and are placed in a directory.

The user now wants to locate all of the responses where the serial number is greater than "0000004500."

To accomplish this, the user can open a program, such as Adobe Acrobat™, and then open either the original form or any one of the form instances returned.

Next, the user can interact with a search UI which imports the inferred schema. For example, the search field names and types can be imported from a form template in an existing form instance, or from form data in the form instance.

The system can then build a search query based on search criteria received through the search UI, which displays possible field names. For example, when the type information for a "serial number" is present in the form template, or the form data, the user would be able to choose "serial number" in the UI, and would automatically be presented with a numeric value entry field for a serial number, and a set of operators, such as "is-greater-than."

Finally, the user can run the query by pressing a "search button" to return a list of PDF files which have a matching value in the serial number which is greater than 0000004500. What can be returned is either the instance information for the unfilled fields in the search dialog or the actual files (e.g. PDF, XDF, etc) containing the matching data. Note that this search process is impossible in existing systems without programming in advance or without the use of a forms management system.

Also note that the above technique can be used to search through two or more forms that have a different structure except for sharing a few common field names. All forms could be searched, even though they have a different structure, and matches can be found where the field names and types are compatible. An example would be a set of different tax forms that all have a Social Security Number within each form. The 1040 form could be used as a template for searching, and as long as the other forms, such as a 1024A form, have the same field name for Social Security Number, they can be searched.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for generating queries to search for matching forms in a set of previously submitted forms, comprising:
obtaining a form template for previously submitted form instances, wherein the form template includes a form schema which specifies field names and data types for fields in the previously submitted form instances associated with the form template, wherein the previously submitted form instances were created using said form template;
generating a user interface dependent on the same form template used to create the previously submitted form instances, wherein the user interface comprises input options for accepting search criteria from a user, wherein the input options correspond to one or more fields defined by the form schema;
generating a query based on search criteria entered by the user for one or more fields defined by the form schema;
running the query against the set of previously submitted forms to identify matching forms; and
generating a list of the matching forms.

2. The method of claim 1, wherein generating the user interface comprises importing the form template into the user interface (UI), wherein the UI uses the form schema to generate type-specific input options which enable the user to specify search criteria for fields defined in the form template.

3. The method of claim 1, wherein running the query-involves running the query against forms in the set of previously submitted forms which contain matching fields for the search criteria, but which have a different structure than the structure defined by the form template.

4. The method of claim 1, wherein running the query against the set of forms involves automatically generating an index of data from the forms in the set of previously submitted forms, so that subsequent searches involving the previously submitted forms will utilize the index.

5. The method of claim 1, wherein running the query against a given form in the set of previously submitted forms involves:
opening the given form; and
evaluating the query for specific data values from specific fields in the given form to determine if the given form matches the query.

6. The method of claim 1, wherein the set of previously submitted forms comprises a directory in a file system which contains previously submitted forms as data files in the directory.

7. The method of claim 1, wherein the form template additionally includes presentation information defining the appearance and placement of data fields in a visual rendering of an associated form instance.

8. A non-transitory computer-readable storage device storing program instructions that when executed by a computer cause the computer to perform a method for generating queries to search for matching forms in a set of previously submitted forms, the method comprising:
obtaining a form template for previously submitted form instances, wherein the form template includes a form schema which specifies field names and data types in fields in the previously submitted form instances associated with the form template, wherein the previously submitted form instances were created using said form template;
generating a user interface dependent on the same form template used to create the previously submitted form instances, wherein the user interface comprises input options for accepting search criteria from a user, wherein the input options correspond to one or more fields defined by the form schema;
generating a query based on search criteria entered by the user for one or more fields defined by the form schema;
running the query against the set of previously submitted forms to identify matching forms; and
generating a list of the matching forms.

9. The non-transitory computer-readable storage device of claim 8, wherein generating the user interface comprises importing the form template into the user interface (UI), wherein the UI uses the form schema to generate type-specific input options which enable the user to specify search criteria for fields defined in the form template.

10. The non-transitory computer-readable storage device of claim 8, wherein running the query involves running the query against forms in the set of previously submitted forms which contain matching fields for the search criteria, but which have a different structure than the structure defined by the form template.

11. The non-transitory computer-readable storage device of claim 8, wherein running the query against the set of forms involves automatically generating an index of data from forms in the set of previously submitted forms so that subsequent searches involving the previously submitted forms will utilize the index.

12. The non-transitory computer-readable storage device of claim 8, wherein running the query against a given form in the set of previously submitted forms involves:
opening the given form; and
evaluating the query for specific data values from specific fields in the given form to determine if the given form matches the query.

13. The non-transitory computer-readable storage device of claim 8, wherein the set of previously submitted forms comprises a directory in a file system which contains previously submitted forms as data files in the directory.

14. The non-transitory computer-readable storage device of claim 8, wherein the form template additionally includes presentation information defining the appearance and placement of data fields in a visual rendering of an associated form instance.

15. An apparatus that generates queries to search for matching forms in a set of previously submitted forms, comprising:
a retrieval mechanism configured to retrieve a form template for previously submitted form instances, wherein the form template includes a form schema which specifies field names and data types in fields in the previously submitted form instances associated with the form template, wherein the previously submitted form instances were created using said form template;
a user interface generator configured to generate a user interface dependent on the same form template used to create the previously submitted form instances, wherein the user interface (UI) is configured to allow a user to specify search criteria for one or more fields defined by the form schema;

a query generator configured to generate a query based on search criteria entered by the user; and a query processor configured to run the query against the set of forms to identify matching forms.

16. The apparatus of claim 15, wherein the UI is configured to import the form template including the form schema; and wherein the UI is configured to use the form schema to generate type-specific input options which enable the user to specify the search criteria for fields defined in the form template.

17. The apparatus of claim 15, wherein the query processor is configured to run the query against forms in the set of previously submitted forms which contain matching fields for the search criteria, but which have a different structure than the structure defined by the form template.

18. The apparatus of claim 15, wherein the query processor is also configured to automatically generate an index of data from the forms in the set of previously submitted forms, so that subsequent searches involving the previously submitted forms will utilize the index.

19. The apparatus of claim 15, wherein while running the query against a given form in the set of previously submitted forms, the query processor is configured to:

open the given form; and to evaluate the query for specific data values from specific fields in the given form to determine if the given form matches the query.

20. The apparatus of claim 15, wherein the set of previously submitted forms comprises a directory in a file system which contains previously submitted forms as data files in the directory.

* * * * *